United States Patent [19]

Brown et al.

[11] 4,004,084
[45] Jan. 18, 1977

[54] VIDEO CONFERENCING SYSTEM USING SPATIAL REDUCTION AND TEMPORAL RESOLUTION

[75] Inventors: Earl Franklin Brown, Piscataway; John Ormond Limb, Tinton Falls; Birendra Prasada, Matawan, all of N.J.

[73] Assignee: Bell Telephone Laboratories, Incorporated, Murray Hill, N.J.

[22] Filed: Mar. 3, 1976

[21] Appl. No.: 663,622

[52] U.S. Cl. .......................... 358/133; 178/DIG. 3; 179/2 TS; 358/146
[51] Int. Cl.[2] ..................... H04N 7/12; H04N 7/18
[58] Field of Search ............... 178/6, 8, DIG. 3; 179/2 TV, 2 TS

[56] References Cited
UNITED STATES PATENTS

| | | | |
|---|---|---|---|
| 3,519,744 | 7/1970 | Dorros | 179/2 TS |
| 3,601,530 | 8/1971 | Edson | 179/2 TS |
| 3,715,483 | 2/1973 | Limb | 178/DIG. 3 |

OTHER PUBLICATIONS

D. Mitchell, "Better Video Conferences," *Bell Labs. Record*, vol. 48, No. 1, (Jan. 1970), pp. 19–22.
J. O. Limb, et al., "Exchange of Spatial and Temporal Resolution in Television Coding," 50 BSTJ191 (Jan. 1971), pp. 191–199.
B. G. Haskell, et al., "Interframe Coding of Videotelephone Pictures," *Proceedings of the IEEE*, vol. 60, No. 7 (July 1972), pp. 792–800.
A. J. Seyler, et al., "The APO TV–Conferencing Facility," *Telecommunications Journal of Australia*, vol. 23, No. 3, (1973), pp. 216–225.

*Primary Examiner*—Howard W. Britton
*Attorney, Agent, or Firm*—Richard J. Roddy

[57] ABSTRACT

Video conferencing, wherein the outputs of a plurality of television cameras at one location are transmitted to a second location so that parties at the first location are perceived as present by parties at the second location, has received some attention directed toward bandwidth reduction. The subject invention relates to an improved video conferencing system for reducing bandwidth by advantageously applying temporal resolution and spatial reduction to a video picture provided by each camera. The temporal resolution of a picture from one or more of the cameras can be automatically adapted to a control signal, for example, to a speech level control signal so as to advantageously interleave and to give priority to a picture from one camera over a picture from other television cameras. The spatial reduction of each picture obtains by transmitting and displaying less than the total picture, illustratively the middle two-thirds of the picture from each camera.

11 Claims, 6 Drawing Figures

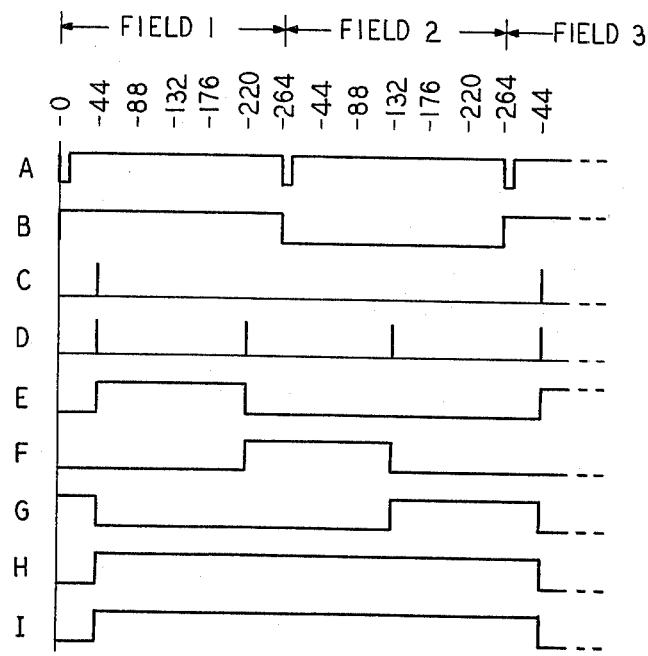
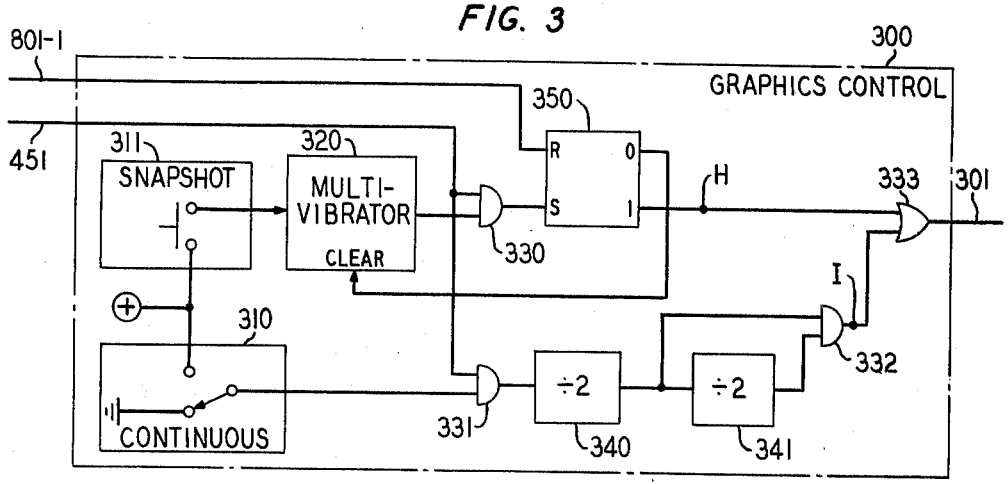
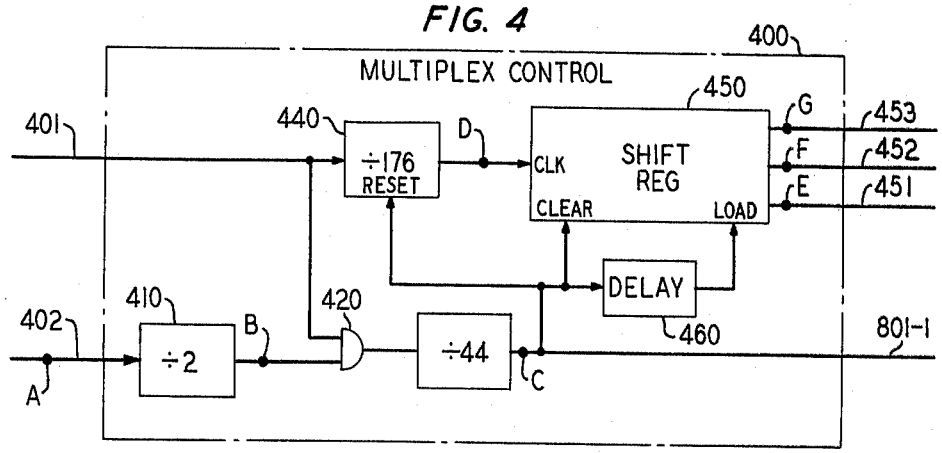

VIDEO CONFERENCING SYSTEM USING SPATIAL REDUCTION AND TEMPORAL RESOLUTION

BACKGROUND OF THE INVENTION

1. Field of the Invention

This invention relates to visual telephone systems and, more particularly, to a video conference system connecting two or more groups of conferees in a manner which approaches a true face-to-face conference situation.

2. Description of the Prior Art

Visual telephone systems presently provide communication between at least two locations for allowing a video conference among groups of conferees situated at each location. A common objective in video conferencing arrangements, wherein the outputs of a plurality of television cameras at one location are transmitted along with audio signals to a corresponding plurality of television monitors at a second location, is for conferees at the first location to be perceived as present by conferees at the second location. This perception is usually called video presence. In achieving good video presence, the number of conferees included in a video picture from each camera is normally limited to a few people, typically three or four. Thus, there are normally three or four cameras at a transmitter and a like number of monitors at a receiver, each strategicaly focused or positioned, to achieve good video presence for a typical conference.

An impetus for improving the video conferencing art is that the cost of using this type communication system may be less than the cost of using an alternative, for example, the cost of using commercial travel. However, as the number of television cameras and monitors at each location increases, the increases typically resultant from an increase in the number of conferees at the location, communication costs may also rise. One way to reduce communication cost is to reduce bandwidth.

Accordingly, an object of the present invention is to provide an improved video conference system for reducing bandwidth.

Known video bandwidth reduction arrangements often employ either temporal resolution or spatial reduction techniques. For example, one way to reduce bandwidth using temporal resolution is disclosed in U.S. Pat. No. 3,601,530, issued to R. C. Edson et al on Aug. 24, 1971 and entitled "A Video Conference System Using Voice Switched Cameras". That prior art system uses a 4.3 megahertz (MHz), two-way television circuit to transmit and receive black and white, 525-line pictures of conferees, printed material, or drawings. In that system, a video picture is selectively transmitted from only one of the plurality of cameras. Hence, the temporal resolution is an "all or nothing" technique. Specifically, a microphone is associated with each camera. In response to the loudest detected speech signal, a voting circuit causes the camera, which is covering the microphone generating the loudest speech signal, to be enabled. It is the video picture from that camera which is transmitted to the remote location along with the audio signal. As different people in the group speak, the appropriate camera is selectively enabled so that the outgoing video picture provides a good visual image of the person then talking. Unfortunately, only the selected video picture is transmitted. Hence, the monitors at the second location each show the same video picture. Thus, movement or speech by conferees who are not providing the loudest speech signal may go unnoticed by conferees at the second location, a detriment to obtaining good video presence.

Accordingly, another object of the present invention is to provide a video conference system with improved video presence.

Another prior art video conferencing system for reducing bandwidth is disclosed in the publication A. J. Seyler et al., "The APO TV-Conferencing Facility," *Telecommunications Journal of Australia*, Vol 23, No. 3 (1973), pp 216–225. That system obtains a reduced bandwidth by spatial reduction, in particular by transmitting a spatial portion of a video picture corresponding to less than the total video picture available from the camera. Specifically, each of two television cameras transmits one-half its respective video picture. The two half pictures are combined and transmitted to the second location where they are appropriately separated and shown as half-pictures on respective monitors. While that system appears to improve video presence and to reduce bandwidth, unacceptable picture detail may result as the number of television cameras increases, there being less and less of the total video picture transmitted.

Accordingly, still another object of the present invention is to provide an improved video conference system for reducing bandwidth while improving video presence and picture detail.

SUMMARY OF THE INVENTION

These and other objects are attained in accordance with the principles of our invention in improved apparatus for reducing bandwidth in a video conference system by advantageously combining spatial reduction and temporal resolution. According to one aspect of our invention, bandwidth is reduced by a temporal resolution of a video picture, for example, by interleaving one or more fields of a video picture from one or more cameras using a prefixed rotational sequence. According to a second aspect to our invention, bandwidth is reduced and improvement in picture detail is obtained by spatial reduction of a picture so as to provide, for example, more than one-half of the total raster of the picture to a monitor. According to another aspect of our invention, improved video presence is obtained by selectively interleaving a predetermined field of each picture. According to still another aspect of our invention, the temporal resolution of the pictures is selectively adjusted responsive to a control signal, there being at least two possible control signals, for example, one a speech level threshold signal and another a request for transmission from a second group of video cameras.

BRIEF DESCRIPTION OF THE DRAWING

Our invention should become fully apparent when taken in connection with the following detailed description and the accompanying drawing in which:

FIG. 2 illustrates a timing signal waveform diagram showing signals within the apparatus of FIG. 1;

FIG. 3 illustrates a graphic control for use in the apparatus illustrated in FIG. 1;

FIG. 4 illustrates a multiplexer control for use in the apparatus illustrated in FIG. 1;

DETAILED DESCRIPTION

A brief description of the operation of a television tube will be helpful in understanding the detailed description of an illustrative embodiment of the present invention. It is well-known that a television tube has a device for producing a stream of electrons. The stream impinges upon a film of fluorescent material deposited on the inner surface of the tube's face-plate. The material glows at the point of electron stream impingement. Well-known circuitry causes the electron stream to scan, i.e., to sweep horizontally and vertically, in such a manner that the stream produces a series of glowing parallel lines on the face-plate of the television tube, the series of parallel lines being known as a raster and for displaying a video picture. One type of raster is formed by first producing all the odd numbered lines, these lines being called the first field, and then producing the even numbered lines, the latter being called the second field. The overall effect is that the lines of the first field are interlaced with the lines of the second field to produce a 2:1 interlaced raster, also called a frame. Another type of raster is formed by sequentially producing a single field of raster lines; hence, this type is called a sequential raster. In order to emphasize the broad generality of the present invention, the detailed description of an illustrative embodiment thereof will include both types of raster. Specifically, a graphics television camera-monitor combination will be described for containing a graphics picture of usually static matter as, for example, printed material or drawings. In that connection, the graphics combination will be illustrated using a 525-line, 2:1 interlaced raster with a 30 hertz (Hz) frame repetition rate. Also, a conferee television camera-monitor combination for obtaining a conferee picture will be described as using a 264-line sequential raster with a 60 hertz field repetition rate. Of course the same is by way of illustration and not of limitation since the conferee combination need not use a sequential raster. For example, it is well-known that a 2:1 interlaced raster may be temporally resolved so that a transmitter may transmit one field thereof and a receiver may receive the first field and linearly interpolate the second field. Similarly, the graphics combination need not use an interlaced raster but could use a sequential raster. These various combinations should be borne in mind throughout the ensuing detailed description.

Figure 1:
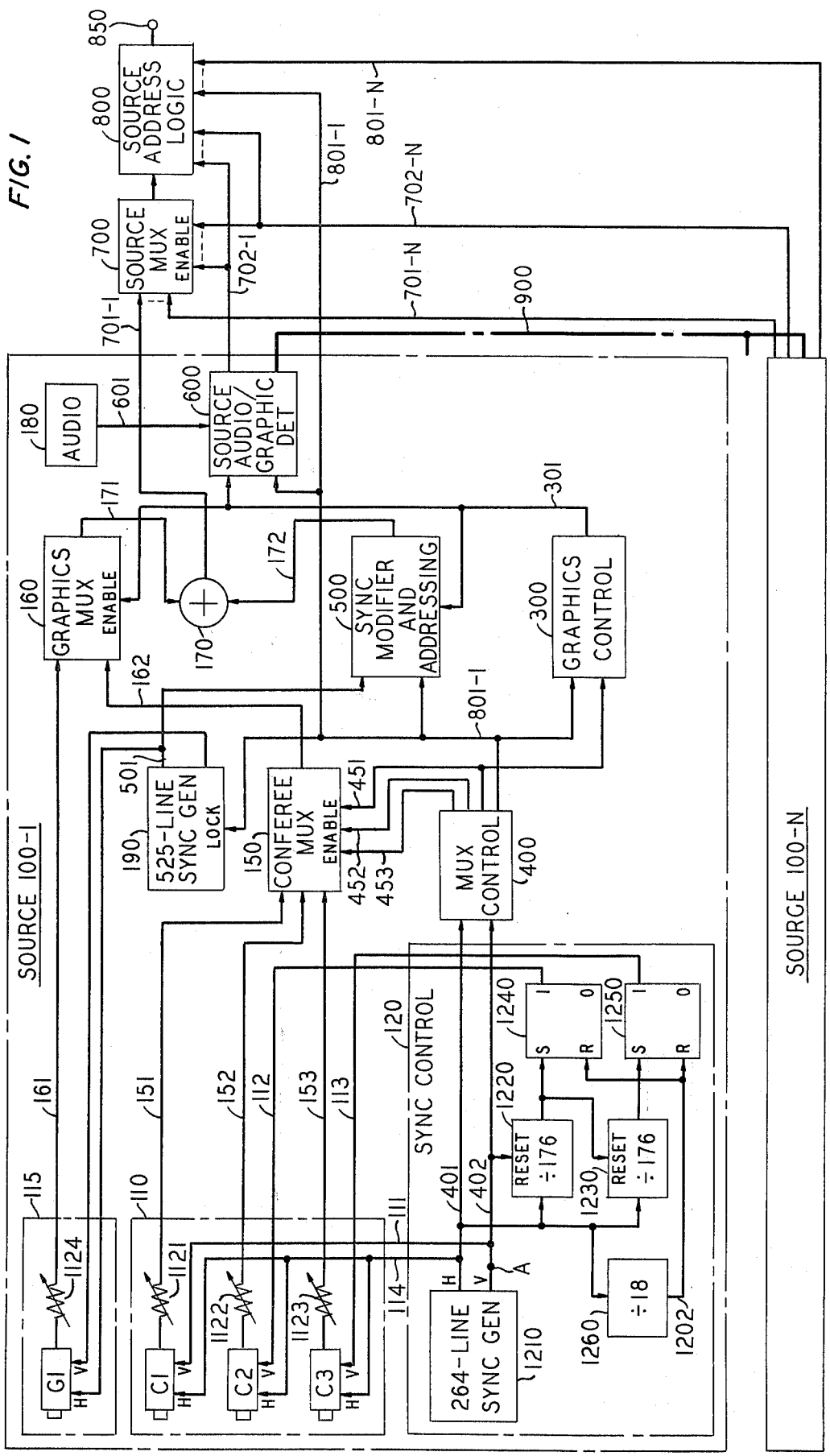
FIG. 1 shows in schematic block diagram form an illustrative transmitter of a video conference system for connecting one or more groups of conferees in a manner which approaches a true face-to-face conference situation.

Turning now to the drawing, FIG. 1 shows in schematic block diagram form an illustrative transmitter of a video conference system for connecting two or more groups of conferees in a manner which approaches a true face-to-face conference situation. For purposes of illustrating a number of aspects of the invention, only a two-group conference situation need be considered. However, as will be evident hereinafter, the features of our invention are in no way limited to that situation, having equal applicability, for example, to a conference having more than two groups. For more than two groups, some additional switching will normally be employed. The additional switching may be of the type disclosed in U.S. Pat. No. 3,519,744, issued on July 7, 1970 and entitled "Apparatus for Connecting Visual Telephone Sets in a Conference Arrangement".

A visual telephone system typically comprises a proximate location, usually having transmitter and receiver, the transmitter being shown in detail in FIG. 1 and described hereinafter, and a remote location, which is not shown. The apparatus and modes of operation for the two locations parallel one one another and hence only one location need be covered in detail. Also, only a transmitter will be described, it being evident from that description how to construct a receiver for separating the received signal, responsive to later described addressing signals, and displaying a picture on a respective video monitor.

Broadly, in accordance with one aspect of the invention, our improved video conference system obtains a reduction in bandwidth over prior art video conference arrangements by advantageously interleaving one or more fields of a picture in a predetermined order, illustratively by way of time division multiplexing picture signals from the respective cameras over a single television circuit. The illustrative proximate location transmitter of FIG. 1 includes a plurality of sources 100-1 to 100-N connected through source multiplexer 700 to source address logic 800, an output of which is extended to terminal 850, for transmission to the remote location. Each source, e.g., source 100-1, may include conferee camera group 110, each group having one or more conferee cameras, here cameras C1, C2 and C3, for obtaining a conferee video picture. For purposes of illustration, three conferee cameras are disclosed, each cameras assumed to be strategically focused upon one or more conferees at the proximate location. Also, graphics camera group 115, for brevity only one graphics camera G1 being here illustrated, may be included in each source, e.g., source 100-1, for obtaining the aforementioned graphics video picture. An output picture signal from each camera is extended through a respective amplitude balancing network, here shown as variable resistors 1121 to 1124, to a multiplexer. Specifically, an output from each conferee camera is extended therethrough to a respective input of conferee video multiplexer 150, while an output from each graphics camera is extended to a respective input of graphics video multiplexer 160. The camera output signals are advantageously time division multiplexed by the multiplexers, responsive to signals from multiplexer control 400 to a respective multiplexer ENABLE input. The then multiplexed signals are thereafter extended through adder circuit 170 for adding synchronizing and address signals to the multiplexed picture signals. A resultant composite output signal from circuit 700 is then provided to an input of source multiplexer 700 and, ultimately, may be provided onto terminal 850. Thereby, in accordance with this first aspect of our invention, our improved video conference system interleaves the respective picture signals from one or more camera over a single television circuit to obtain a reduction in bandwidth.

According to a second aspect of our invention, improved picture detal is achieved by selectivelyy transmitting a predetermined spatially reduced portion of the total picture obtained from a camera. Illustratively, the middle two-thirds of the video picture from each conferee camera within group 110 is transmitted to the remote location responsive to control signals extended from sync control 120 and multiplex control 400 to conferee camera group 110 and conferee multiplexer 150, respectively. Although horizontal spatial reduction may be employed individually or in combination with vertical spatial reduction, our illustrative embodiment in transmitting the middle two-thirds of a conferee camera picture will assume only vertical spatial reduction. Specifically, each conferee camera is assumed to produce a single field 264-line sequential raster. Numbering the raster lines from the top to the bottom of the picture, discarding lines 1–44 and 221–264, and transmitting raster lines 45 through 220, which is a total of 176 lines, corresponds to transmitting the middle two-thirds of the picture. By the thus broadly described spatial reduction of a picture, a decrease in bandwidth is achieved as well as improved picture detail.

This second aspect of our invention is further made clear by way of a description of a third aspect of our invention whereby an improvement in video presence is achieved. As mentioned, the field rate of a standard sequential raster camera is 60 hertz. Thus, a new field is usually transmitted from the camera and displayed at a monitor each 1/60-th of one second. Hence, the transmission and display of two-thirds the total picture would occur in about 1/90-th of one second. In our illustrative embodiment, there are disclosed three conferee cameras. Hence, the time for displaying the three spatially reduced pictures is about 1/30-th of one second. In other words, while bandwidth has been reduced to accommodate three pictures on one circuit, for example, one a one megahertz PICTUREPHONE channel, the true field rate has been reduced from 60 hertz to 30 hertz. Such a reduction in field rate may lead to a problem of flicker at a receiver monitor. On the one hand, to avoid flicker, a memory may be provided at each receiver to store the received field of each conferee video picture and field respeat same at a 60 hertz rate. On the other hand, since alternate fields of the picture are transmitted, the messing field may be estimated by linear interpolation thereof. Notwithstanding, improved picture detail is achieved by displaying larger portions of the total picture, for example, than are displayed in the aforementioned prior art spatial reduction arrangement. Almost at the same time, improved video presence is achieved with an improved temporal resolution of the picture.

To still further approach a true face-to-face conference situation, and hence to still further improve video presence, and in line with a fourth aspect of our invention, the temporal resolution of pictures from at least one camera is selectively adjusted, the adjustment being automatically adaptive responsive to a predetermined control signal. For example, a picture from one source of conferee cameras may be advantageously interleaved by way of time division multiplexing to give pictures from that source a priority over pictures from other sources. As a result, proportionally more pictures are transmitted from that source, and hence less jerkiness, e.g., as caused by motion within the picture scene, is perceived by a conferee at the remote location. Since it is commonly true that increased motion is associated with speaker, one illustration of selectively adjusting the temporal resolution of a picture may be an arragement responsive to a speech level control signal. Thus, a subjectively more pleasing picture is obtained, e.g., a picture showing motion of a conferee therein. As a result, still further improvement in video presence is achieved.

Now turning to illustrative apparatus for practicing these and other aspects of our invention, we first consider the operation of the illustrative apparatus relative to conferee camera group 110 and second, the operation relative to graphics camera group 115. Broadly, single field video picture signals are extended from 264-line sequential raster conferee cameras C1, C2 and C3 respectively to conferee video multiplexer 150 by way of leads 151, 152 and 153. Horizontal and vertical synchronizing signals are extended from sync control 120 to camera group 110, the former over lead 114 jointly to each camera C1, C2 and C3; the latter over leads 111, 112 and 113 to the respective conferee camera C1, C2 and C3. Specifically, sync control 120 includes 264-line sync generator 1210 for providing well-known horizontal and vertical signals for controlling the horizontal and vertical sweep of a television camera. Inasmuch as the illustrative embodiment relates to a vertical spatial reduction arrangement for reducing bandwidth, the horizontal sweep signal provided sync generator 1210 is extended over lead 114 jointly to the horizontal sweep (H) inputs of conferee cameras C1, C2 and C3. In addition, that signal is extended to multiplex control 400 over lead 401 and, within control 120, to an input of "÷18" circuit 1260 as well as an input of "÷176" circuits 1220 and 1230. However, again because our illustrative embodiment discloses vertical spatial reduction, a different vertical sweep signal is used for each conferee camera. Hence, the additional apparatus including "÷176" circuits 1220 and 1230 and flip-flops 1240 and 1250 within sync control 120. Specifically, a master vertical sweep signal, illustrated as signal "A" in FIG. 2, which figure will be more fully discussed in connection with a later description of multiplex contrl 400, is extended over lead 111 to a vertical sweep (V) input of conferee camera C1 for enabling the vertical sweep of that camera. In addition, the master vertical sweep signal is extended over lead 402 to multiplex control 400 and to a reset input of "÷176" circuit 1220. Upon detection by circuit 1220 of the passage of 176 horizontal lines after the beginning of the first line in camera C1, and assuming for now a logic one signal to be a more positive signal than a logic zero, a logic one signal is extended from an output of circuit 1220 jointly to a set input of flip-flop 1240 and a reset input of "÷176" circuit 1230. A reset input signal is jointly provided to flip-flops 1240 and 1250 from sync generator 1210 through "÷18" circuit 1260 then over lead 1202 to the respective flip-fop, the reset signal having a change in logic state each 18 horizontal lines. As a result, flip-fop 1240 is set by the logic one output signal from "÷176" circuit 1220 and is reset by a logic one output signal from "÷18" circuit 1260, thus producing a vertical sweep signal over lead 112 to a V input of conferee camera C2. Responsive to the logic one output signal from "÷176" circuit 1220, circuit 1230 is reset. As mentioned, that logic one is provided 176 lines after circuit 1220 commences to count. Thereafter, an output of "÷176" circuit 1230 is provided to a set input of flip-flop 1250, responsive to which a vertical sweep signal is extended from flip-flop 1250 over lead 113 to a V input of conferee camera C3. Thereby, a different vertical sweep signal is provided to each of the illustrative three conferee cameras for sequentially enabling the vertical sweep of the respective camera. Hence, in rotation, each camera, e.g., first camera C1, then camera C2, then camera C3, then camera C1, etc., provides a 264-line picture to video multiplexer 150. However, since the vertical sweep of one camera commences 176 lines after the beginning of the sweep of the camera preceding in the rotational sequence, multiplexer 150 passes only a 176-line picture. Of course, as aforementioned, a 176-line raster corresponds to the middle two-thirds of the video picture. Hence, the conferee pictures can be spatially reduced.

Up to this juncture, we have described a process for obtaining spatially reduced video pictures in a predetermined order from conferee cameras C1, C2 and C3 and extending the picture signals respectively over leads 151, 152 and 153 to video multiplexer 150. Responsive to clock control signals from multiplex control 400, the clock signals being extended respectively over leads 451, 452 and 453 for controlling respective camera picture signal, the aforementioned picture signals are advantageously interleaved by conferee multiplexer 150 and extended therefrom to graphic multiplexer 160. Multiplex control 400, which is illustrated in FIG. 4, will be described in conjunction with the timing signal waveform diagram of FIG. 2. As to FIG. 2, the abscissa is labeled to correspond to an assumed raster line numbering of a video picture. The illustrative clock control signal waveforms in FIG. 2 are logic signals, the more positive signal being a logic one. As to multiplex control 400, the previously described horizontal and vertical sweep signals, appearing on leads 401 and 402, are extended to control 400 from sync generator 1210. The master vertical sweep signal, on lead 402 and identified in FIGS. 2 and 4 as signal A, is extended through "÷2" circuit 410, an output of which is labeled waveform B in FIG. 2, to a first input of AND gate 420. The horizontal sweep signal on lead 401 is extended jointly to an input of "÷176" circuit 440 and a second input of AND gate 420. An output of AND gate 420 is extended through "÷44" circuit 430 thence over lead 801-1 jointly to a RESET input of "÷176" circuit 440; to a CLEAR input and, through delay circuit 460, to a LOAD input of shift register 450. Thereby, an output of circuit 440, labeled waveform D in FIG. 2 and applied to a CLK input of shift register 450, is in synchronization with the output of circuit 430, labeled waveform C in FIG. 2. Also, the clock signal having waveform D is available to identify each count of 176 horizontal lines. Responsive to clock signal D, the preloaded signal at the LOAD input of shift register 450 is shifted there through, thus producing waveform E on lead 451, waveform F on lead 452 and waveform G on lead 453.

As an aside and as should be evident in FIG. 2 by comparing waveforms E, F and G with the abscissa and since in our illustrative embodiment a spatially reduced 176-line picture is transmitted for each of three cameras, a total of 528 (= 176 × 3) lines is transmitted. The time for that transmission equals the time normally used for transmitting a 264-line nonspatially reduced picture for each of two cameras, i.e., 264 × 2 = 528. Specifically, that time period is about 1/30-th of one second. Hence, three 176-line spatially reduced pictures are compressed into two 264-line field periods. Accordingly, the illustrative embodiment of our improved video conference system, having compressed three pictures into the time period, or time slot, normally consumed by two pictures, substantially reduces bandwidth.

The three clock signal outputs of shift register 450, having respectively waveforms E, F, and G, are thereafter applied to respective ENABLE inputs of conferee multiplexer 150. Responsive to a logic one in waveform E on lead 451, multiplexer 150 passes a 176-line picture signal of camera C1; responsive to a logic one in waveform F on lead 452, a 176-line picture signal of camera C2; responsive to a logic one in waveform G on lead 453, a 176-line picture signal of camera C3. Thereby, the illustrative embodiment of our improved system in passing the video picture signals advantageously interleaves the spatially reduced video pictures from one or more conferee cameras in a predetermined rotational sequence to obtain a reduction in bandwidth.

Having discussed the operation of illustrative apparatus relative to conferee camera group 110, we now turn our attention to a description of the operation of illustrative apparatus relative to graphics camera group 115. In that connection, graphics camera group 115 will be illustrated using a single camera having a two-field, 525-line, 2:1 interlaced raster with a 30 hertz frame repetition rate. Further, although spatial reduction techniques could be applied to a graphics picture, our illustrative embodiment will assume a nonspatially reduced graphics picture. In particular, group 115 is illustrated as including a single television camera G1, an output of which is extended through amplitude balancing network 1124 to an input of graphics multiplexer 160. Horizontal and vertical sweep signals are extended from 525-line sync generator 190 to the respective H and V sweep inputs of camera G1, paralleling that described for conferee camera C1. Sync generator 190 is reset responsive to a logic one in waveform C, which, as shown in FIG. 2, is provided at the 44-th horizontal line of alternate fields, and appears on lead 801-1 as an output of control 400.

As mentioned, a graphics picture signal is extended from graphic camera G1 over lead 161 to a first input of graphics multiplexer 160. Also, the conferee pictures on leads 151, 152 and 153 after being interleaved by conferee multiplexer 150 are extended therefrom over lead 162 to a second input of graphics multiplexer 160. The respective input of multiplexer 160 is advantageously selected in response to a logic signal appearing at its ENABLE input. The selected input is extended therethrough then over lead 171 to adder circuit 170 where synchronizing and address signals are added to the picture signals. In particular, responsive to a logic one signal at its ENABLE input, the signal being extended thereto from graphics control 300 over lead 301, the first input, or graphics picture signal on lead 161, is passed through multiplexer 160. On the other hand, responsive to a logic zero signal, the second input, or interleaved conferee picture signals on lead 162, are so passed. Accordingly, the frequency of transmission of a graphics picture is dependent upon the frequency of supplying a logic one to the ENABLE input of multiplexer 160. In turn, the frequency of that logic one enable signal may relate to the mode of operation of graphics camera group 115. For brevity, two modes of operation will be described. The first mode, called the snapshot mode, allows for the transmission of a single frame, i.e., both fields of the interlaced raster, of a graphics picture by "robbing" a single 1/30-th of one second time slot from the conferee camera group operation. It will be remembered that 1/30-th of a second is the time to transmit a spatially reduced picture from each of three conferee camera. Thus, in the snapshot mode, the two fields of the interlaced frame are dynamically and aperiodically inserted in a 1/30-th of one second time slot. As should be evident from the name describing the mode, the snapshot mode would usually be employed for viewing essentially static matter needing little, if any, picture update. On the other hand, the occasion may arise wherein the graphics matter may involve more temporal change and hence require more frequent update to attain good video presence. Hence, a second mode of operation, called the continuous graphics mode, will be illustrated using a more frequent update than that employed in the snapshot mode. Specifically, the illustrative embodiment of the continuous mode will periodically rob every fourth 1/30-th of one second time slot, thus allowing for more frequent transmission and update of a graphics picture. Clearly, there may arise need for other modes of operation, for example, using a conferee camera in place of a graphics camera. However, again for brevity, our discussion is confined to a discussion of the snapshot and continuous modes.

We now describe an illustrative arrangement in which the waveform of the logic signal appearing on lead 301 is dependent upon the selected graphics mode of operation. First, as to the snapshot mode of operation, it will be remembered that the time to transmit both fields of the graphics picture, i.e., 1/30-th of one second, is here illustratively equal to the time to transmit three spatially reduced pictures from conferee group 110. Fortuitously, it is observed, for example, in referring to FIG. 2, that waveform C includes a logic one pulse in synchronism with the just mentioned time relationship. Hence, we use logic signal C in our illustrative embodiment by extending same over lead 801-1 from an output of control 400 thence, in FIG. 3 to the reset terminal of flip-flop 350 of graphics control 300 for resetting flip-flop 350 and clearing multivibrator 320. To provide the appropriate logic one signal over lead 301 then to the ENABLE terminal of graphics multiplexer 160, pushbutton snapshot switch 311 may be depressed thereby permitting multivibrator 320 to extend a logic one to a first input of AND gate 330. In addition, waveform E appearing on lead 451 is provided to a second input of AND gate 330 and to a first input of AND gate 331. An output of AND gate 330 is connected to a set input of flip-flop 350. Responsive to the coincidence of a logic one at the two inputs of AND gate 330, flip-flop 350 is set, the resultant signal being illustrated as waveform H in FIG. 2 and being extended through a first input of OR gate 333 over lead 301 to the aforementioned ENABLE terminal of multiplexer 160. Responsive to a logic one ENABLE signal on lead 301, the graphics picture signal on lead 161 is inserted in a 1/30-th of one second time slot. Thereby, both fields of the 2:1 interlaced graphics picture are transmitted. As mentioned, flip-flop 350 is reset two fields after it is set responsive to a logic one pulse on lead 801-1, i.e., waveform C. As a result, waveform H on lead 301 is typically a logic zero until pushbutton switch 311 is operated. Thus, in the snapshot mode, multiplexer 160 is enabled to interleave a graphics picture in an aperiodic manner, as here illustrated once responsive to each depression of switch 311.

Second, we describe the continuous mode of operation. Continuous switch 310, a standard on-off switch, may be operated to continuously extend a logic one signal to a second input of AND gate 331. An output of AND gate 331 is extended through "÷2" circuit 340 jointly to a first input of AND gate 332, and, through "÷2" circuit 341, to a second input of AND gate 332. An output of AND gate 332, having a waveform illustrated in FIG. 2 as waveform I, is then extended through OR gate 333 thence in a manner paralleling the snapshot mode of operation over lead 301 to periodically enable multiplexer 160. It is worth mentioning that waveforms H and I, while on their face appearing identical in FIG. 2, are actually different. Specifically, waveform H is a logic one responsive to a typical momentary depression of pushbutton switch 311 and, hence, is a logic one for single frame from graphic camera G1. On the other hand, as long as switch 310 is operated, waveform I is periodic so as to provide a periodic logic one to the second input of AND gate 331. The illustrative period is 1/7.5-th of a second. That is, the graphics picture in the continuous mode of operation is transmitted in every fourth time slot, each time slot being 1/30-th of one second, until switch 310 is disabled.

Figure 5:
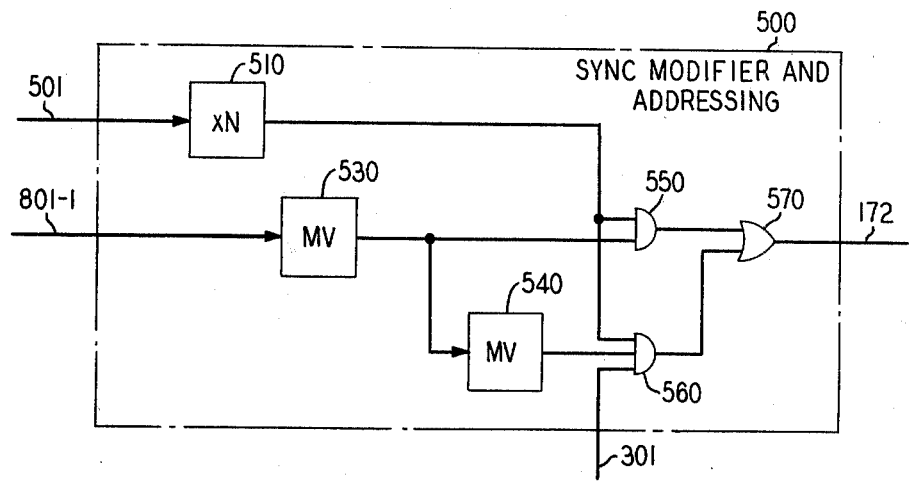
FIG. 5 illustrates a synchronizing modifier and addressing circuit for use in the apparatus illustrated in FIG. 1.

By way of a quick review, we have thus far described apparatus for spatially reducing pictures obtained from conferee group 110 and for combining thereto nonspatially reduced graphic pictures from graphics group 115. In addition, we have described apparatus for temporally resolving the pictures. The resultant picture signals are extended through graphics multiplexer 160 thence over lead 171 to an input of the aforementioned adder circuit 170, where synchronizing and address signals are added to the picture signals. The signals to be added are provided to a second input of circuit 170 from synchronizing modifier and addressing circuit 500 by way of lead 172. Turning our attention now to circuit 500, an illustrative embodiment of which is shown in FIG. 5, a synchronizing signal is provided for indicating the 44-th horizontal line of alternate fields as well as for indicating the beginning of a time slot into which may be inserted either a conferee or graphic group picture. Also, an address signal is provided for indicating whether the time slot contains a picture from conferee group 110 or a picture from graphics group 115. In particular, as to the synchronizing signal, a horizontal synchronizing pulse on lead 501 is extended from sync generator 190 to an input off "×N" multiplier 510, the latter for increasing the horizontal pulse rate by the number of sources in the transmitter, here illustratively by N. The aforedescribed C waveform, shown in FIG. 2 and appearing on lead 801-1, is provided to an input of one-shot multivibrator 530. Responsive to a logic one pulse in waveform C, multivibrator 530 is enabled at the beginning of the 44-th horizontal line of alternate fields to provide a logic one signal having a duration equal to 1/N-th of the period of a horizontal synchronizing pulse, e.g., nominally (1/(N×15734))-th of a second. An output of multivibrator 530 is extended to an input of one-shot multivibrator 540 and to a first input of AND gate 550, a second input to which is provided by an output of multiplier 510. In response to the coincidence of a logic one signal on the two inputs of AND gate 550, a logic one pulse is extended to a first input of OR gate 570 and thence to lead 172. Thereby, a logic one synchronizing signal is provided to circuit 500 for indicating the 44-th line of alternate fields and for indicating the beginning of a 1/30-th of one second time slot into which may be inserted either a conferee or graphic group picture. Else, the synchronizing signal is a logic zero.

Also, as to the address signal, a logic one is extended over lead 172 by way of the output of multivibrator 530 being extended through multivibrator 540 to a first input of AND gate 560 and thence to a second input of OR gate 570. A second input to AND gate 560 is provided by an output of multiplier 510; while a third input is provided from graphics control 300 over lead 301. Upon detection of a coincidence of logic one pulses on the three inputs to AND gate 560, a logic one addressing signal is extended therefrom through OR gate 570 onto circuit 170 for indicating that a graphic picture is being transmitted. The coincidence occurs during a second horizontal output pulse from multiplier 510, i.e., the second pulse after the beginning of the 44-th horizontal line of alternate fields. Else, a logic zero address signal is so extended indicating a conferee picture. Thereafter, the resultant composite signal, including picture, synchronizing, and address signals, is extended from adder 170 over lead 701-1 to source multiplexer 700.

Figure 6:
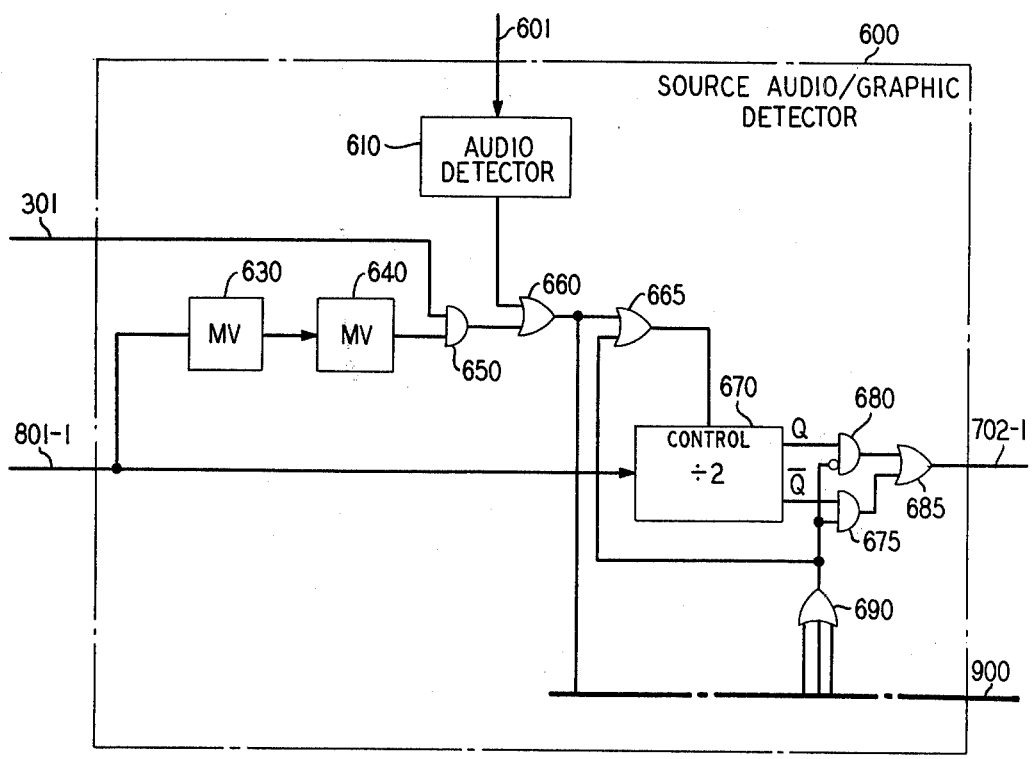
FIG. 6 illustrates a source audio/graphic detector for use in the apparatus illustrated in FIG. 1.

As to detector 600 and in accordance with the previously mentioned fourth aspect of our invention, the temporal resolution of a picture from at least one camera may be selectively adjusted, the adjustment being automatically adaptive responsive to a predetermined control signal. One control signal selected for our illustrative embodiment is a speech level control signal. Further, and by way of an alternative control signal, a temporal resolution may be adjusted responsive to a source graphics picture transmission request control signal. Broadly, each of sources 100-1 through 100-N at a proximate location may include one or more conferee cameras or may include one or more graphics cameras. Referring to FIG. 1, each source also may include therein audio pick-up apparatus 180. Speech signals, for example, as picked up by one or more microphones located within audio apparatus 180 and typically physically adjacent to each group of conferees, are extended over lead 601 to audio detector 610 within detector 600 as illustrated in FIG. 6 for determining whether a speech level as picked up by any microphone at that source exceeds some predetermined threshold. Upon detection of such exceeding, a logic one signal is extended from detector 610 through OR gates 660, 665 and 685 onto lead 702-1 so as to permit enabling source multiplexer 700. By way of the alternative, detector 600 includes one-shot multivibrators 630 and 640, which operate substantially the same as multivibrators 530 and 540 in circuit 500. In response to the detection of a coincidence of a logic one at respective first and second inputs of AND gate 650, the first input being provided from an output of multivibrator 640 and the second input being waveform H or I in FIG. 2, which is provided on lead 301 from graphics control 300, a logic one is extended from an output of AND gate 650 through OR gate 660, 665 and 685, also onto lead 702-1, again for enabling source multiplexer 700. Thereby, in accordance with this fourth aspect of our invention, the temporal resolution of a picture may be selectively adjusted. Concurrent with enabling source multiplexer 700 and responsive to the just described logic one on lead 702-1, an output of OR gate 660 is extended over cable 900 for providing an inhibit signal to an OR gate 690 at each of the remaining (N − 1) sources in the transmitter. Responsive to the inhibit signal, those respective (N − 1) sources supply a logic zero to the respective enable lead 702-2 to 702-N of source multiplexer 700, thereby inhibiting multiplexer 700 from interleaving signals supplied thereto over a respective one of leads 701-2 through 701-N. Hence, priority may be selectively given to signals, here illustratively, appearing on lead 701-1, over signals on any of the remaining leads, here 701-2 through 701-N. Further, the temporal resolution of the respective picture is selectively adjusted. Absent that inhibit signal, signals from any of the sources may be interleaved without priority by way of multiplexer 700 in response to an appropriate enable signal. Hence, the nonpriority temporal resolution of each picture is approximately equal. Thereby, pictures from cameras in one source at the transmitter are advantageously interleaved through multiplexer 700 to give pictures from cameras at that source a priority over pictures from cameras at any of the other sources. Thus, a subjectively more pleasing picture is obtained, for example, during motion of the conferee in the thus displayed picture. Hence, still further improvement in video presence is achieved.

Further, in order to identify the transmitter source 100-1 through 100-N having a picture inserted in a time slot whether the picture be a conferee group picture or a graphics group picture, source address logic 800, in a manner parallel to that for the aforedescribed circuit 500, advantageously inserts address information in the transmitted signals. Specifically, responsive to a logic one enable signal on leads 702-1 through 702-N, source address logic 800 advantageously inserts a source address signal in the 44-th horizontal line signal of alternate fields, the synchronization to the 44-th line being in response to waveform C in a manner paralleling that already described relative to circuit 500, which is also extended to logic 800 over leads 801-1 through 801-N.

Although the invention has been described and illustrated in detail, it is to be understood that the same is by way of illustration and example only. Various modifications will occur to those skilled in the art and the invention is not to be considered limited to the illustrative embodiment shown for purposes of disclosure. Thus, the spirit and scope of the invention are limited only by the appended claims.

What we claim is:
1. In a video conferencing system, apparatus for reducing bandwidth of a plurality of video pictures; each picture having one or more fields, each picture being provided by a corresponding one of a plurality of video cameras, and each picture for display on a corresponding one of a plurality of video monitors; said apparatus including means for spatially reducing a picture from a first group of one or more cameras, said spatial reduction means including means for providing a spatial portion of said picture from said first group of cameras, said spatial portion being less than the total raster of a picture and CHARACTERIZED IN THAT said apparatus further comprises:
   temporal resolution means operative upon said picture from said first group of cameras, said temporal resolution means including means for interleaving each picture in said first group in a prefixed rotational sequence.

2. The apparatus defined in claim 1 wherein said spatial portion providing means includes means for improving picture detail, said picture detail improving means including means for providing more than one-half of said total raster.

3. The apparatus defined in claim 1 further comprising:
   means responsive to a control signal for replacing said first group of pictures with a picture from a second group of one or more cameras.

4. The apparatus defined in claim 1 further comprising:
   means adapted to detect a predetermined control signal, and
   means responsive to said detected control signal for selectively adjusting said temporal resolution of said first group of pictures.

5. The apparatus defined in claim 4 wherein said predetermined control signal detecting means includes means adapted to receive a speech signal.

6. The apparatus defined in claim 1 wherein said interleaving means includes means for improving video presence, said video presence means including means for selectively interleaving a predetermined field of each picture from said first group.

7. In a video conferencing system, apparatus for reducing bandwidth of a plurality of video signals, each signal having one or more fields and each signal being provided by a corresponding one of a plurality of sources, each source having one or more video cameras, said apparatus comprising
   means for spatially reducing a video picture from a first group of cameras in each source, said spatial reduction means including means for providing a spatial portion of said video picture, said spatial portion being less than the total raster of said video picture;
   means coupled to said spatial reduction means for temporally resolving each said spatially reduced video picture, said temporal resolution means including means for selectively transmitting a predetermined field of said picture; and
   receiver means for linearly interpolating a nontransmitted field of said picture.

8. The apparatus defined in claim 7 further comprising:
   means for providing a predetermined control signal; and
   means responsive to said control signal for selectively adjusting said temporal resolution of said spatially reduced picture from at least one of said signal sources.

9. The apparatus defined in claim 8 wherein said predetermined control signal is a speech level control signal.

10. The apparatus defined in claim 9 wherein said temporal resolution selective adjusting means are responsive to a predetermined threshold level of said speech level control signal.

11. The apparatus defined in claim 7 further comprising:
   means for providing a predetermined control signal and means reponsive to said control signal for selectively adjusting said temporal resolution of a picture from a second group of one or more cameras at each source.

* * * * *